(12) United States Patent
Goetting et al.

(10) Patent No.: US 11,660,966 B2
(45) Date of Patent: May 30, 2023

(54) CONTROL SYSTEM FOR AN ELECTRIC MACHINE FOR PRODUCING A BRAKING TORQUE BY MEANS OF THE ELECTRIC MACHINE, AND METHOD FOR OPERATING A CONTROL SYSTEM FOR AN ELECTRIC MACHINE

(71) Applicant: Robert Bosch GmbH, Stuttgart (DE)

(72) Inventors: Gunther Goetting, Stuttgart (DE); Falco Sengebusch, Stuttgart (DE); Sebastian Paulus, Esslingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/622,292

(22) PCT Filed: Jun. 12, 2020

(86) PCT No.: PCT/EP2020/066320
§ 371 (c)(1),
(2) Date: Dec. 23, 2021

(87) PCT Pub. No.: WO2020/260039
PCT Pub. Date: Dec. 30, 2020

(65) Prior Publication Data
US 2022/0258613 A1 Aug. 18, 2022

(30) Foreign Application Priority Data
Jun. 26, 2019 (DE) ...................... 10 2019 209 219.5

(51) Int. Cl.
*B60L 3/00* (2019.01)
*B60L 7/00* (2006.01)
(Continued)

(52) U.S. Cl.
CPC ................ *B60L 7/003* (2013.01); *H02P 3/06* (2013.01); *B60L 15/025* (2013.01); *B60L 2240/421* (2013.01); *B60L 2240/429* (2013.01)

(58) Field of Classification Search
CPC ...... B60L 3/0046; B60L 7/003; B60L 15/025; B60L 2240/421; B60L 2240/429; B60T 13/586; B60W 10/30; H02P 3/06
See application file for complete search history.

(56) References Cited

U.S. PATENT DOCUMENTS

2009/0069964 A1* 3/2009 Wyatt ................... B60W 10/30
701/22
2012/0031692 A1* 2/2012 Koike ................... B60T 13/586
903/902
(Continued)

FOREIGN PATENT DOCUMENTS

DE 102010054452 A1 6/2011
DE 102011081173 A1 2/2013
(Continued)

OTHER PUBLICATIONS

Translation of International Search Report for Application No. PCT/EP2020/066320 dated Sep. 17, 2020 (2 pages).

*Primary Examiner* — Cortez M Cook
(74) *Attorney, Agent, or Firm* — Michael Best & Friedrich LLP

(57) ABSTRACT

The present invention relates to a control system (10) for an electric machine (EM), for producing a braking torque, by means of the electric machine (EM), in a traction drive, said system comprising a control device (SE), the control device (SE) being configured to control a generator voltage or a generator current in or through a power electronics system (LE) of the electric machine such that during a movement of
(Continued)

the traction drive, the electric power (Pel) of the electric machine (EM) can be limited to a level at least below a predefined minimum value.

15 Claims, 2 Drawing Sheets

(51) Int. Cl.
  *H02P 3/06* (2006.01)
  *B60L 15/02* (2006.01)

(56) References Cited

U.S. PATENT DOCUMENTS

| | | | |
|---|---|---|---|
| 2014/0156130 A1 | 6/2014 | Ogawa et al. | |
| 2015/0258897 A1* | 9/2015 | Okada | B60L 3/0046 |
| | | | 318/376 |

FOREIGN PATENT DOCUMENTS

| | | |
|---|---|---|
| DE | 102016220602 A1 | 9/2017 |
| DE | 102016210238 A1 | 12/2017 |
| EP | 1297992 A2 | 4/2003 |
| EP | 2644435 A1 | 10/2013 |

* cited by examiner

CONTROL SYSTEM FOR AN ELECTRIC MACHINE FOR PRODUCING A BRAKING TORQUE BY MEANS OF THE ELECTRIC MACHINE, AND METHOD FOR OPERATING A CONTROL SYSTEM FOR AN ELECTRIC MACHINE

BACKGROUND OF THE INVENTION

The present invention relates to a control system for an electric machine for generating a torque by means of the electric machine and a method for operating a control system for an electric machine.

In the case of electric vehicles, during a movement of the electric vehicle the electric motor generates a recuperation energy that is generated from the kinetic movement energy of the vehicle. The generated recuperation energy is mainly transmitted as electrical energy to the consumer in the vehicle and to the battery. For the case that the battery is unable to accept any more energy since said battery is fully charged, defective or not connected, the energy flow to the battery can be suppressed. Electric motors are usually unable to generate torque themselves without in so doing supplying the battery or a consumer with current.

On the other hand, when driving downhill for a long time or driving with a trailer, an additional torque is required from the machine in order to be able to relieve the brake system. If the electric motor itself is unable to generate additional torque, the conventional brake system has to be dimensioned far too large.

DE 10 2010 054 452 A1 describes a brake control device for an electric vehicle, which on the basis of the wheels calculates a target braking torque. The brake control device can act as an ABS control. The brake control device can comprise a battery for storing regenerated energy and based on a state of charge generate an engine torque command.

SUMMARY OF THE INVENTION

The present invention provides a control system for an electric machine for generating a braking torque by means of the electric machine and a method for operating a control system for an electric machine.

Advantages of the Invention

The fundamental idea of the present invention is to provide a control system for an electric machine for generating a braking torque by means of the electric machine and a method for operating a control system for an electric machine, wherein, even if the battery of the vehicle is defective, fully charged or not connected, it is still possible to generate a controlled braking torque by means of the electric machine without in so doing releasing electrical power or still possible to be able to keep this within a predetermined value range. Such an additional braking torque renders it possible to relieve a mechanical brake.

In accordance with the invention, a control system for an electric machine comprises a control facility for generating a braking torque by means of the electric machine in a traction drive, wherein the control facility is configured so as to control a generator voltage or a generator current in or by means of an electronic power system of the electric machine in such a manner that during a movement of the traction drive an electrical power of the electric machine can be limited at least to a predetermined minimum value.

The control system is advantageously suitable for electric vehicles and hybrid vehicles. The electrical power that can be stored in a DC circuit, possibly for a battery of the electric drive, can be advantageously kept below a specific value or at zero.

In accordance with a preferred embodiment of the control system, the control facility comprises a switch unit which is connected to machine clamps and/or to the electronic power system and which is configured so as to switch a short circuit at the machine clamps and/or at the electronic power system.

The braking torque can then be advantageously generated by means of the electric machine if the electrical power is zero or close to zero and the associated generator voltage is equal to zero or close to zero (below a predetermined limit value). In this case, the generator voltage can be zero or close to zero if a short circuit occurs at the machine clamps of the electric machine, possibly by way of a connector, or at one of the electronic components, for example at one of the semiconductor elements (for example the inverter) in the electronic power system of the electric machine. In the case of the short-circuiting of semiconductor elements, it is possible for an upper and lower short circuit to occur in an alternating manner, possibly in the case of semiconductors that are thermally protected in a three-phase or multi-phase half bridge or full bridge.

In accordance with a preferred embodiment of the control system, the control facility is configured so as to determine a rotational speed of the electric machine and to calculate or generate therefrom a generator current that is generated by the electric machine in such a manner that an electrical power of the electric machine which is associated with the generator current can be achieved as less than a predetermined limit value or equal to zero.

In accordance with a preferred embodiment of the control system, the control facility is configured so as to determine a rotational speed of the electric machine and in dependence upon the rotational speed to determine therefrom a characteristic field for a generator current that is generated by the electric machine, and to determine the generator current in dependence upon the rotational speed from the characteristic field.

In accordance with a preferred embodiment of the control system, the control facility is configured so as to determine from the characteristic field in dependence upon the rotational speed a current phase angle that is associated with the generator current.

In accordance with a preferred embodiment of the control system, the control facility comprises a power control facility that is configured so as to generate a current phase angle that is associated with the generator current in such a manner that the electrical power of the electric machine can be limited to below the predetermined minimum value or can be set to zero.

In accordance with a preferred embodiment of the control system, the control facility comprises a current controlling facility that is configured so as for the respectively determined rotational speed of the electric machine to receive in each case the determined value for the generator current and the associated current phase angle and in dependence upon the determined rotational speed to control it in such a manner that a generator voltage and an associated voltage phase angle are generated in the electric machine with the result that the electrical power of the electric machine can be limited to below the predetermined minimum value or can be set to zero.

In accordance with a preferred embodiment of the control system, the control facility is connected to the electric machine and a generator current that results after the control procedure by means of the current control facility in the electric machine can be applied thereto afresh as an input variable for the current control facility.

In accordance with a preferred embodiment of the control system, the control facility is configured so as, from the generator current that results in the electric machine and/or from the value of the voltage phase angle that respectively is associated with the resulting generator current and/or from the value of the generator voltage that respectively is associated with the resulting generator current, to determine a resulting electrical power of the electric machine and to generate it as an input variable for the power control facility.

In accordance with the invention, in the case of the method for operating a control system for an electric machine, a generator voltage or a generator current is controlled in or by means of the electronic power system of the electric machine in such a manner that during a movement of a traction drive an electrical power of the electric machine is limited to at least below a predetermined minimum value and in so doing a braking torque is generated by the electric machine in the traction drive.

In accordance with a preferred embodiment of the method, the control facility determines a rotational speed of the electric machine and determines therefrom a characteristic field for a generator current that is generated by the electric machine in dependence upon the rotational speed. The control facility can determine the generator current in dependence upon the rotational speed from the characteristic field or calculate said generator current.

In accordance with a preferred embodiment of the method, a power control facility generates a current phase angle that is associated with the generator current in such a manner that the electrical power of the electric machine is limited to below the predetermined minimum value or is set to zero.

In accordance with a preferred embodiment of the method, a current control facility receives for the respectively determined rotational speed of the electric machine in each case the determined value for the generator current and controls the associated current phase angle in dependence upon the determined rotational speed in such a manner that a generator voltage and an associated voltage phase angle are generated in the electric machine with the result that the electrical power of the electric machine is limited to below the predetermined minimum value or is set to zero.

In accordance with a preferred embodiment of the method, a generator current that results after the control procedure by means of the current control facility in the electric machine can be applied thereto afresh as an input variable for the current control facility.

In accordance with a preferred embodiment of the method, from the generator current that results in the electric machine and/or from the value of the voltage phase angle that respectively is associated with the resulting generator current and/or from the value of the generator voltage that respectively is associated with the resulting generator current, the control facility determines a resulting electrical power of the electric machine and generates this as an input variable for the power control facility.

The method can also be advantageously characterized by the features mentioned already in connection with the control system and their advantages and conversely.

Further features and advantages of embodiments of the invention are disclosed in the description below with reference to the attached drawings.

BRIEF DESCRIPTION OF THE DRAWINGS

The present invention is further explained below with the aid of the exemplary embodiment that is disclosed in the schematic figures of the drawing.

In the drawing.

In the figures, like reference numerals describe like or like-functioning elements.

DETAILED DESCRIPTION

Figure 1:
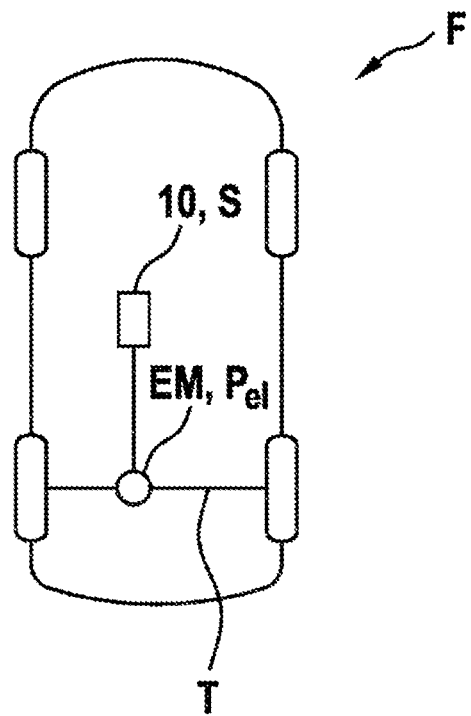
FIG. 1 illustrates a schematic view of a control system for an electric machine in accordance with an exemplary embodiment of the present invention in an electric vehicle.

FIG. 1 illustrates a schematic view of a control system for an electric machine in accordance with an exemplary embodiment of the present invention in an electric vehicle.

An electric vehicle F or a hybrid vehicle can have a traction drive T that can be driven by an electric machine EM. In addition to a mechanical brake, the electric machine can also advantageously generate a braking torque in such a manner that the battery is not charged by the recuperation energy. For this purpose, it is possible to set a generator voltage to be equal to or close to zero in order to be able to keep the electrical power $P_{el}$ close to or equal to zero. In order to be able to implement this, the electric machine is connected to a control system 10.

The control facility in the control system 10 can comprise a switch unit S which is connected to machine clamps and/or to the electronic power system of the electric machine EM and which is configured so as to switch a short circuit at the machine clamps and/or at the electronic power system.

Figure 2:
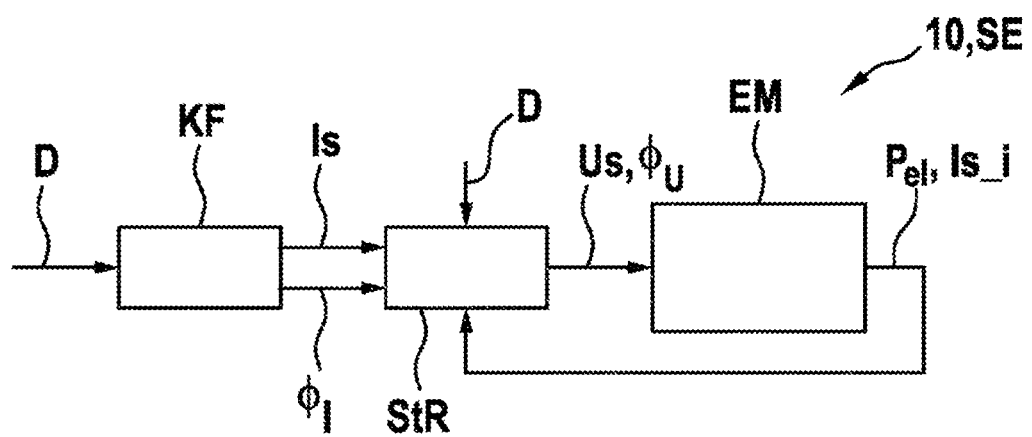
FIG. 2 illustrates a schematic block diagram of a control system in accordance with a further exemplary embodiment of the present invention.

FIG. 2 illustrates a schematic block diagram of a control system in accordance with a further exemplary embodiment of the present invention.

The control system 10 for an electric machine EM comprises a control facility SE, wherein the control facility SE is configured so as to control a generator voltage or a generator current in or by means of an electronic power unit LE of the electric machine in such a manner that during a movement of the traction drive an electrical power $P_{el}$ of the electric machine EM can be limited at least to below a predetermined minimum value.

In so doing, the control facility SE can be configured so as to determine a rotational speed D of the electric machine EM, in other words advantageously read it out from a monitoring procedure of the operation of the electric machine, and using a characteristic field KF to determine therefrom a generator current Is that is generated by the electric machine EM in dependence upon the rotational speed D (the phase and the current are in this case functions of the rotational speed). Furthermore, the control facility SE can be configured so as to determine a current phase angle $\phi_I$ that is associated with the generator current Is from the characteristic field KF in dependence upon the rotational speed D, in other words to determine in which phase the current is in the case of the prevailing rotational speed.

The control facility SE can furthermore comprise a current control facility StR which can receive in each case a value for the generator current Is and the associated current phase angle $\phi_I$ from the control facility. The current control facility StR can be configured so as, for the respectively determined rotational speed of the electrical machine EM, to receive in each case the determined value for the generator current Is and the associated current phase angle $\phi_I$ and in dependence upon the determined rotational speed D to perform a control procedure in such a manner that a generator voltage Us and an associated voltage phase angle $\phi_U$ are generated in the electric machine EM (in other words the generator voltage Us and the associated phase $\phi_U$ can be generated) with the result that the electrical power $P_{el}$ of the electric machine EM can be limited to below the predetermined minimum value or can be set to zero. In so doing, the electric machine can comprise an inverter on which it is possible to apply a corresponding modulation, possibly also having transformation elements (I/O).

It is possible on the basis of the predetermined minimum value to ensure that sufficiently little power flows into the DC circuit for the battery, in particular said power can however be advantageously equal to zero.

The current control facility StR can be connected to the electrical machine EM and a generator current Is_i (predominantly at the outlet of the electrical machine in the respective step) that results after the control procedure by means of the current control facility StR at the electric machine EM can be applied thereto afresh as an input variable for the current control facility StR. Thus, an iterative control loop can be achieved and, after an initial control procedure of the generator current and its phase so as to achieve the generator voltage Us and the associated phase $\phi_U$, it can be adjusted afresh with each step in such a manner in order in an adaptive manner to come closer to the conditions for an electrical power below the predetermined minimum value or at zero.

In so doing, the generator voltage Us can be advantageously set to equal to zero.

Alternatively or in addition thereto, the generator current Is can be controlled in such a manner in the current control facility StR that the electrical power $P_{el}=3*Us*Is*\cos(\phi_{UMI})$ is produced, with $\phi_{UMI}=\mod(\phi_U-\phi_I+\pi, 2*\eta)-\pi)$ as an angle difference between $\phi_U$ and $\phi_I$, the two phase angles can be represented in a field-generating and torque-generating direction.

Thus, $P_{el}$ of the electric machine EM can be below the predetermined minimum value or zero. The current can then be controlled for example using a standard controller with field-oriented control or similar.

Figure 3:
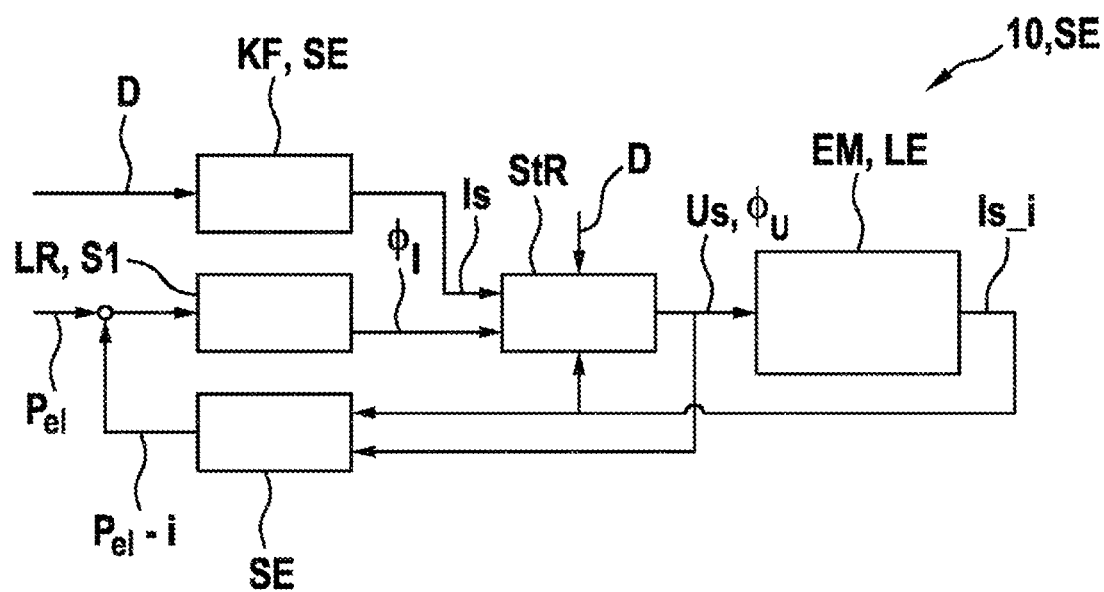
FIG. 3 illustrates a schematic block diagram of a control system in accordance with a further exemplary embodiment of the present invention.

FIG. 3 illustrates a schematic block diagram of a control system in accordance with a further exemplary embodiment of the present invention.

The embodiment illustrated in FIG. 3 differs from that of FIG. 2 to the extent that although the generator current Is or its value is provided in a similar manner to the embodiment in FIG. 2, its phase angle $\phi_I$ is determined and generated in such a manner by the control facility SE that an electrical power $P_{el}$ of the electric machine EM that results from the generator current and its phase can be below the predetermined minimum value or at zero. Consequently, as described with reference to FIG. 2, the generator voltage and its phase can also be controlled based on these values. In iterative steps, an actual power $P_{el}$ can then be determined and the current phase angle $\phi_I$ and/or the generator voltage and its phase adjusted afresh.

For this purpose, the control facility SE can comprise a power control facility LR that is configured so as to generate a current phase angle $\phi_I$ that is associated with the generator current Is in such a manner that the electrical power $P_{el}$ of the electric machine EM can be limited to below the predetermined minimum value or can be set to zero. In other words, in the case of the given length of the current Is, the phase angle of the current can be adjusted such that the electrical power is minimum or zero and such that no power or almost no power is flowing into the DC circuit, possibly of a battery. In so doing, the control facility SE can initially set a power that is to be achieved equal to zero and determine the resultant required phase for the determined generator current (determined from the rotational speed), advantageously generate it and transmit it as an input variable to the current control facility StR.

Furthermore, the exemplary embodiment illustrated in FIG. 3 can also comprise a further feedback control loop, advantageously use the current Is-i that is actually prevailing at the electric machine EM in order to determine an actual prevailing electrical power of the machine EM and determine a difference with respect to the desired power $P_{el}=0$. This control loop can be realized by means of the control facility SE. To that end, further variables, such as possibly the generator voltage Us and its phase angle $\phi_u$, can also be taken into consideration. For this purpose, the control facility SE can be configured so as, from the generator current Is_i that results in the electrical machine EM, and/or from the value of the voltage phase angle $\phi_U$ that is associated respectively with the resulting generator current Is_i, and/or from the value of the generator voltage Us that is associated respectively with the resulting generator current Is_i, to determine a resulting electrical power $P_{el}$-i of the electric machine and generate it as an input variable for the power control facility LR for a new control procedure of the phase of the generator current.

Figure 4:
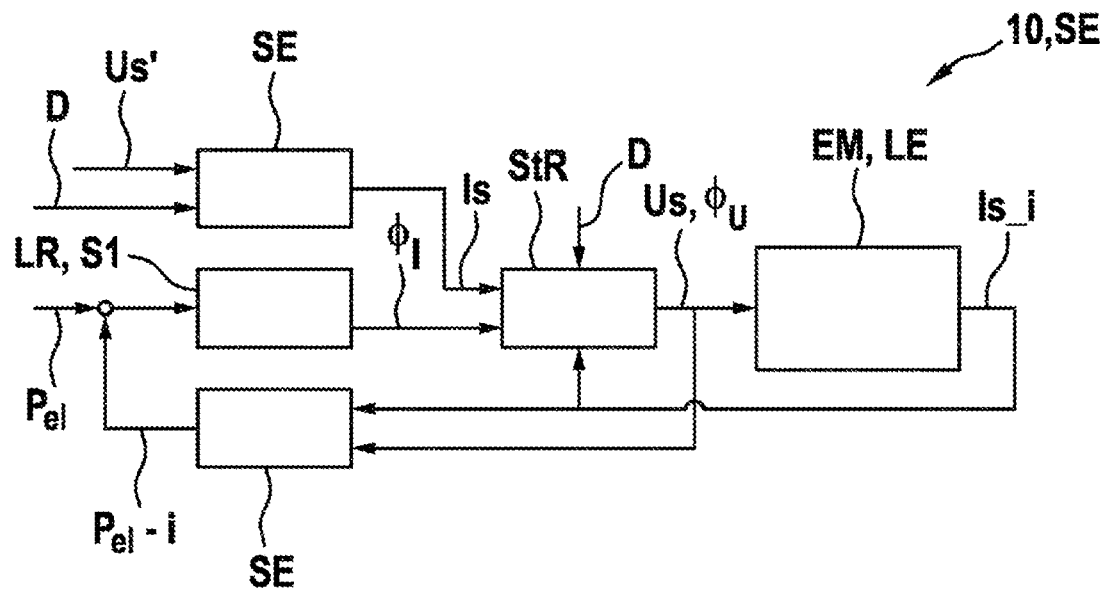
FIG. 4 illustrates a schematic block diagram of a control system in accordance with a further exemplary embodiment of the present invention.

FIG. 4 illustrates a schematic block diagram of a control system in accordance with a further exemplary embodiment of the present invention.

The embodiment illustrated in FIG. 4 differs from that of FIG. 3 to the extent that, in lieu of the initial determination of the generator current Is for the respective rotational speed D, this is not determined from a characteristic field but rather a desired generator voltage Us'=0 can be specified, possibly by the control facility SE, which by means of a corresponding selection of the generator current Is can then lead to a minimized or diminishing electrical power $P_{el}$ (by determining the further variables as explained in FIG. 3). The control facility SE can thus be configured so as to determine a rotational speed D of the electric machine EM and to calculate or generate therefrom a generator current Is that is generated by the electric machine EM, in such a manner that an electrical power of the electric machine EM that is associated with the generator current Is can be generated as less than a predetermined limit value or equal to zero if these specific conditions of the voltages, currents and/or their phases are fulfilled.

Theoretically, in the case of a generator voltage of Us=0, an electrical power equal to zero would then occur if the other variables according to $P_{el}=3*Us*Is*\cos(\phi_{UMI})$.

For Us=0 or $\cos(\phi_{UMI})=0$, it can then occur that $P_{el}=0$ or at least below a limit value that is to be tolerated.

However, deviations of these variables from the determined variables can occur and consequently a predetermined limit value which is to be tolerated can be set for the resulting power (actually determined in the iterative step), below which the power can then be maintained.

By means of controlling the current, possibly by means of the current control facility StR, it is thus possible as a direct result therefrom to also control the torque of the electric machine. It is also possible by means of this control procedure to provide such a torque that does not generate any oscillations or generates almost no oscillations in the drive train, it is thus possible to reduce or avoid jerking in the torque.

Although the present invention has been described in full with the aid of the preferred exemplary embodiment above, it is not limited thereto but rather can be modified in numerous ways.

The invention claimed is:

1. A control system (10) for an electric machine (EM) for generating a braking torque by means of the electric machine (EM) in a traction drive, the control system comprising:
   a control facility (SE), wherein the control facility (SE) is configured to control a generator voltage or a generator current in or by means of an electronic power system (LE) of the electric machine in such a manner that during a movement of the traction drive an electrical power (Pei) of the electric machine (EM) can be limited at least to a predetermined minimum value.

2. The control system (10) as claimed in claim 1, wherein the control facility (SE) comprises a switch unit (S) which is connected to machine clamps and/or to the electronic power system (LE) and which is configured to switch a short circuit at the machine clamps and/or at the electronic power system (LE).

3. The control system (10) as claimed in claim 1, wherein the control facility (SE) is configured to determine a rotational speed (D) of the electric machine (EM) and to calculate or generate therefrom a generator current (Is) that is generated by the electric machine (EM) in such a manner that an electrical power ($P_{el}$) of the electric machine (EM) that is associated with the generator current (Is) can be achieved as less than a predetermined limit value or equal to zero.

4. The control system (10) as claimed in claim 1, wherein the control facility (SE) is configured to determine a rotational speed (D) of the electric machine (EM) and to determine therefrom in dependence upon the rotational speed (D) a characteristic field (KF) for a generator current (Is) that is generated by the electric machine (EM), and to determine the generator current (Is) in dependence upon the rotational speed (D) from the characteristic field (KF).

5. The control system (10) as claimed in claim 3, wherein the control facility (SE) is configured to determine from the characteristic field (KF) in dependence upon the rotational speed (D) a current phase angle ($\phi_I$) that is associated with the generator current (Is).

6. The control system (10) as claimed in claim 3, wherein the control facility (SE) comprises a power control facility (LR) that is configured to generate a current phase angle ($\phi_I$), which is associated with the generator current (Is), in such a manner that the electrical power ($P_{el}$) of the electric machine (EM) is limited to below the predetermined minimum value or can be set to zero.

7. The control system (10) as claimed in claim 3, wherein the control facility (SE) comprises a current control facility (StR) that is configured for the respectively determined rotational speed of the electric machine (EM) to receive in each case the determined value for the generator current (Is) and the associated current phase angle ($\phi_U$-$\phi_I$) and in dependence upon the determined rotational speed (D) to control it in such a manner that a generator voltage (Us) and an associated voltage phase angle ($\phi$U) are generated in the electric machine (EM) with the result that the electrical power ($P_{el}$) of the electric machine (EM) is limited to below the predetermined minimum value or can be set to zero.

8. The control system (10) as claimed in claim 7, wherein the current control facility (StR) is connected to the electric machine (EM) and a generator current (Is_i) that results after the control procedure by means of the current control facility (StR) in the electric machine (EM) can be applied thereto afresh as an input variable for the current control facility (StR).

9. The control system (10) as claimed in claim 8, wherein the control facility (SE) is configured, from the generator current (Is_i) that results at the electrical machine (EM), and/or from the value of the voltage phase angle ($\phi_U$) that is associated respectively with the resulting generator current (Is_i), and/or from the value of the generator voltage (Us) that is associated respectively with the resulting generator current (Is_i), to determine a resulting electrical power ($P_{el}$-i) of the electric machine and to generate it as an input variable for the power control facility (LR).

10. A method for operating a control system (10) for an electric machine (EM), the method comprising the steps:
    controlling (S1) a generator voltage or a generator current in or by means of a power electronics system (LE) of the electric machine in such a manner that during a movement of the traction drive an electrical power ($P_{el}$) of the electric machine (EM) can be limited at least to a predetermined minimum value and in this case a braking torque is generated by means of the electric machine in the traction drive.

11. The method as claimed in claim 10, wherein the control facility (SE) determines a rotational speed (D) of the electric machine (EM) and determines therefrom in dependence upon the rotational speed (D) a characteristic field (KF) for a generator current (Is) that is generated by the electric machine (EM).

12. The method as claimed in claim 11, wherein a power control facility (LR) generates a current phase angle (Phi_I), which is associated with the generator current (Is), in such a manner that the electrical power ($P_{el}$) of the electric machine (EM) is limited to below the predetermined minimum value or is set to zero.

13. The method as claimed in claim 10, wherein a current control facility (StR) receives for the respectively determined rotational speed of the electric machine (EM) in each case the determined value for the generator current (Is) and the associated current phase angle ($\phi_I$) and in dependence upon the determined rotational speed (D) controls the electric machine (EM) in such a manner that a generator voltage (Us) and an associated voltage phase angle ($\phi_U$) are generated in the electric machine (EM) with the result that the electrical power ($P_{el}$) of the electric machine (EM) is limited to below the predetermined minimum value or is set to zero.

14. The method as claimed in claim 13, wherein a generator current (Is_i) that results after the control procedure by means of the current control facility (StR) in the electric machine (EM) is applied thereto afresh as an input variable for the current control facility (StR).

15. The method as claimed in claim 14, wherein, from the generator current (Is_i) that results in the electric machine (EM) and/or from the value of the voltage phase angle ($\phi_U$) that respectively is associated with the resulting generator current (Is_i) and/or from the value of the generator voltage (Us) that respectively is associated with the resulting generator current (Is_i), the control facility (SE) determines a resulting electrical power ($P_{el}$-i) of the electric machine and generates it as an input variable for the power control facility (LR).

* * * * *